(12) United States Patent
Jimenez et al.

(10) Patent No.: US 8,010,615 B2
(45) Date of Patent: Aug. 30, 2011

(54) INSTANT MESSAGING MULTILINGUAL CONFIGURATION

(75) Inventors: Oscar Duran Jimenez, Jalisco (MX); Gabriel Ruelas Arana, Jalisco (MX); Juan Manuel Avalos Vega, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 12/347,278

(22) Filed: Dec. 31, 2008

(65) Prior Publication Data
US 2010/0169769 A1 Jul. 1, 2010

(51) Int. Cl.
*G06F 15/16* (2006.01)
(52) U.S. Cl. ......................................... 709/206; 709/204
(58) Field of Classification Search ................... 709/204, 709/206, 207
See application file for complete search history.

(56) References Cited

U.S. PATENT DOCUMENTS

| | | | |
|---|---|---|---|
| 5,535,120 A | 7/1996 | Chong et al. | |
| 6,530,081 B1 | 3/2003 | Hayes, Jr. | |
| 6,996,520 B2 * | 2/2006 | Levin | 704/10 |
| 2003/0125927 A1 | 7/2003 | Seme | |
| 2006/0089129 A1 * | 4/2006 | Hurst | 455/412.1 |
| 2006/0133585 A1 * | 6/2006 | Daigle et al. | 379/88.06 |
| 2007/0168445 A1 | 7/2007 | Genty et al. | |
| 2007/0168450 A1 | 7/2007 | Prajapat et al. | |
| 2007/0208813 A1 | 9/2007 | Blagsvedt et al. | |

* cited by examiner

*Primary Examiner* — Joseph E Avellino
*Assistant Examiner* — Marshall McLeod
(74) *Attorney, Agent, or Firm* — Yee & Associates, P.C.; Steven L. Bennett (57) ABSTRACT

A computer implemented method, computer usable recordable-type medium having a computer usable program code, and a data processing system provide a custom dictionary associated with an instant messaging contact. A chat window within an instant messaging application with the instant messaging contact is initially opened. The chat window is associated with the instant messaging contact. The instant messaging application then identifies whether the instant messaging contact is listed in a contact list. If the instant messaging contact is listed in a contact list of the instant messaging application, a default language dictionary that is associated with the instant messaging contact is loaded. The default language dictionary is one of a plurality of language dictionaries for languages that can be implemented within the instant messaging application. Further, if the instant messaging contact is listed in a contact list of the instant messaging application, a personal custom dictionary associated with the instant messaging contact is also loaded. The personal custom dictionary is unique to the instant messaging contact and is not shared with other instant messaging contacts.

17 Claims, 6 Drawing Sheets

INSTANT MESSAGING MULTILINGUAL CONFIGURATION

BACKGROUND OF THE INVENTION

1. Field of the Invention

The present invention relates generally to a computer implemented method, a computer program product, and a data processing system. More specifically, the present invention relates to a computer implemented method, a computer program product, and a data processing system for an instant messaging system having simultaneous multilingual configurations.

2. Description of the Related Art

Instant messaging is an online chat medium, allowing users to communicate with each other and collaborate in real-time over a network data processing system. Instant messaging is commonly used over the Internet. Instant messaging applications monitor and report the status of users that have established each other as online contacts. This information is typically presented to a user in a window. Instant messaging applications are also often used by users conducting business. By utilizing instant messaging, business users can view each other's availability and initiate a text conversation with colleagues or customers when a desired contact becomes available.

Typically, with instant messaging applications, communications between users are initiated by users selecting the name of the person with which they desire to communicate. Then, the users type messages in a window of a dialog box and press "send". These messages appear instantly on the selected recipient's computer.

Until now, instant messaging has been developed largely for home users, but used by home and business users alike. Instant messaging allows an organization to deploy and utilize this "need-to-have" technology in a business setting.

BRIEF SUMMARY OF THE INVENTION

According to one embodiment, a computer implemented method, computer usable recordable-type medium having a computer usable program code, and a data processing system provide a custom dictionary associated with an instant messaging contact. A chat window within an instant messaging application with the instant messaging contact is initially opened. The chat window is associated with the instant messaging contact. The instant messaging application then identifies whether the instant messaging contact is listed in a contact list. If the instant messaging contact is listed in a contact list of the instant messaging application, a default language dictionary that is associated with the instant messaging contact is loaded. The default language dictionary is one of a plurality of language dictionaries for languages that can be implemented within the instant messaging application. Further, if the instant messaging contact is listed in a contact list of the instant messaging application, a personal custom dictionary associated with the instant messaging contact is also loaded. The personal custom dictionary is unique to the instant messaging contact and is not shared with other instant messaging contacts.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note, that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
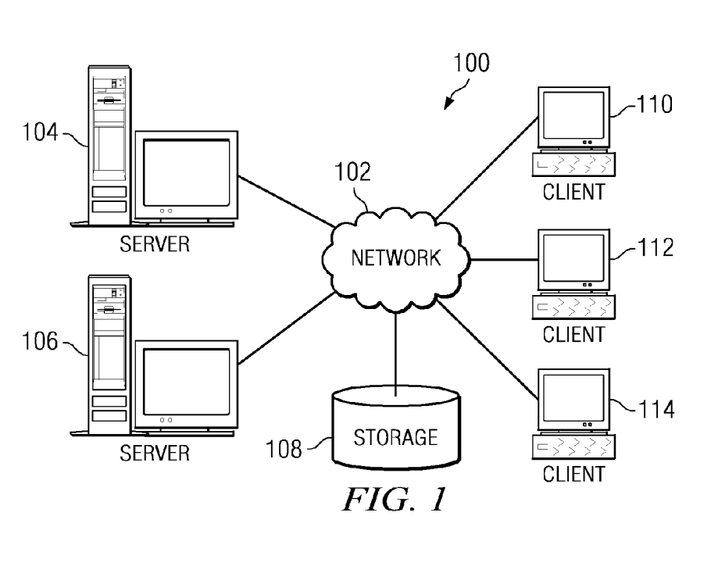
FIG. 1 is a pictorial representation of a network of data processing systems in which illustrative embodiments may be implemented.
Figure 2:
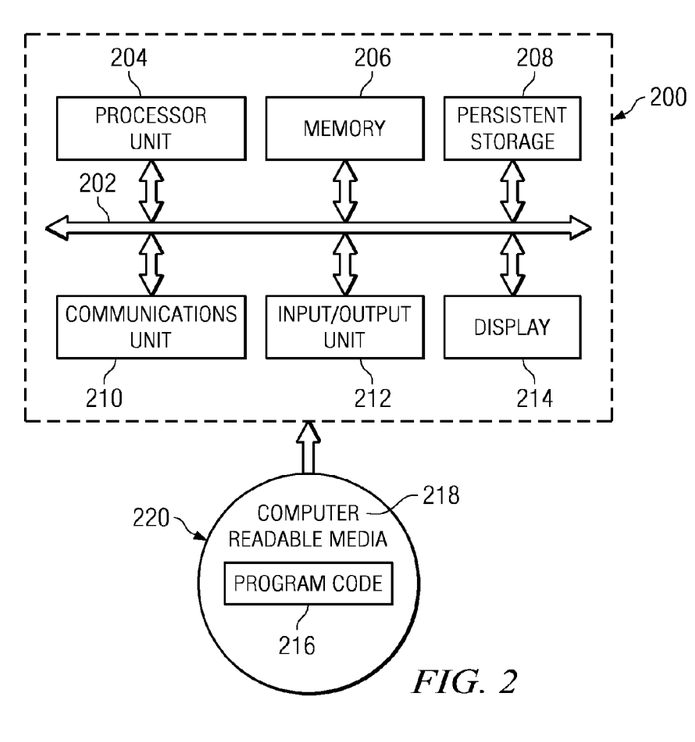
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wires, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include inorganic components integrated with organic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments herein provide a computer implemented method, a data processing system, and a computer program product for providing a custom dictionary associated with an instant messaging contact. Contacts in a contact list are provided with a personal custom dictionary that is associated with the contact. Thus, an instant messaging application may include several personal custom dictionaries, with possibly as many personal custom dictionaries as contacts in the contact list.

When an instant messaging session is initiated, the instant messaging application selects a default dictionary, based on the predominant language that has been indicated for instant messages between the user and the contact. The user can also create a custom dictionary that is personal to the contact, such that entered terms are checked against the instant messaging application selected default dictionary, as well as the personal custom dictionary. By maintaining separate personal custom dictionaries for the contacts, the instant messaging application can switch seamlessly between chat sessions in a variety of languages.

The illustrative embodiments describe a computer implemented method, computer usable recordable-type medium having a computer usable program code, and a data processing system for providing a custom dictionary associated with an instant messaging contact. A chat window within an instant messaging application with the instant messaging contact is initially opened. The chat window is associated with the instant messaging contact. The instant messaging application then identifies whether the instant messaging contact is listed in a contact list. If the instant messaging contact is listed in a contact list of the instant messaging application, a default language dictionary that is associated with the instant messaging contact is loaded. The default language dictionary is one of a plurality of language dictionaries for languages that can be implemented within the instant messaging application. Further, if the instant messaging contact is listed in a contact list of the instant messaging application, a personal custom dictionary associated with the instant messaging contact is also loaded. The personal custom dictionary is unique to the instant messaging contact and is not shared with other instant messaging contacts.

Figure 3:
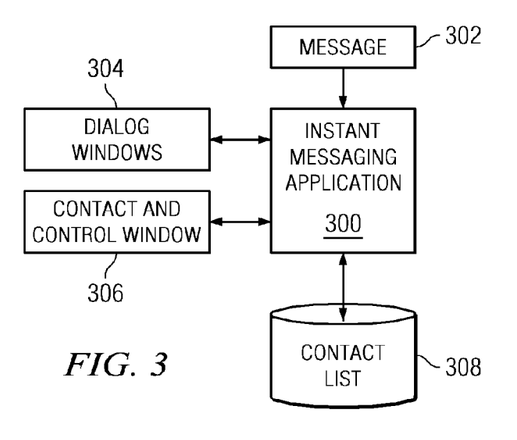
FIG. 3 is a diagram illustrating components used in an instant messaging system in accordance with an illustrative embodiment.

Turning next to FIG. 3, a diagram illustrating components used in an instant messaging system are depicted in accordance with an illustrative embodiment. In the depicted example, instant messaging application 300 processes messages, such as message 302 received from users located on remote data processing systems. As messages are received, these messages are presented in dialog windows 304. Messages exchanged between instant messaging application 300 and an instant messaging application on a remote data processing system form a conversation in these examples.

Additionally, dialog windows 304 provide an interface for user input to send messages to other users. Contact and control window 306 is presented by instant messaging application 300 to provide the user with a list of user names, as well as other information, such as, for example, identifying other users that are currently online. Contact and control window 306 also provides an interface to allow the user to set different preferences. For example, the user may set passwords required to access different names used in instant messaging sessions. Further, a user may employ contact and control window 306 to set other preferences, such as colors and fonts used in instant messaging application 300.

Further, the list of names presented by contact and control window 306 is stored in contact list 308 in these examples. Additional user names may be added or deleted from contact list 308. This contact list is employed in presenting the list of names within contact and control window 306. Additionally, the user may view the status of other users on contact and control window 306. This status may be, for example, available or busy. When the status is available, instant messaging application 300 will accept messages from another instant messaging application to start a new conversation. When the status of another user is busy, messages from instant messaging application 300 are not accepted by the other application for that user.

Figure 4:
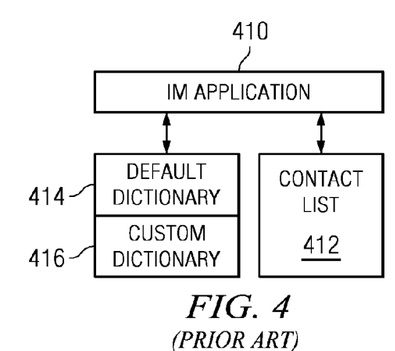
FIG. 4 is a data flow diagram of a default dictionary for an instant messaging application according to the prior art.

Referring now to FIG. 4, a data flow diagram of a default dictionary for an instant messaging application is shown according to the prior art. Instant messaging application 410 can be instant messaging application 300 of FIG. 3. Contact list 412 can be contact list 308 of FIG. 3.

Associated with instant messaging application 410 is default dictionary 414. Default dictionary 414 is an electronic dictionary data store that may include a standard set of widely accepted dictionary terms. The terms in default dictionary 414 can be based upon a published dictionary such as, for example, but not limited to, Webster's® Dictionary. Some instant messaging applications allow a user to select a default dictionary corresponding to the predominant language in which instant message chat will be communicated. However, these prior art solutions will apply the selected default dictionary to each instant message communication, as described below.

Further associated with instant messaging application 410 is custom dictionary 416. Custom dictionary 416 is an electronic dictionary data store that includes additional terms added specifically by a user. The terms in custom dictionary 416 are then used in checking all text entered into instant messaging application 410.

As a user enters messaging text into instant messaging application 410, the entered terms are compared to terms in default dictionary 414, as well as to terms in custom dictionary 416. If the entered term is not found in either of default dictionary 414 or custom dictionary 416, instant messaging application 410 will mark the entered term as misspelled/unknown. The user can then edit the entered term prior to sending the instant message, or can choose to add the entered term to custom dictionary 416.

Figure 5:
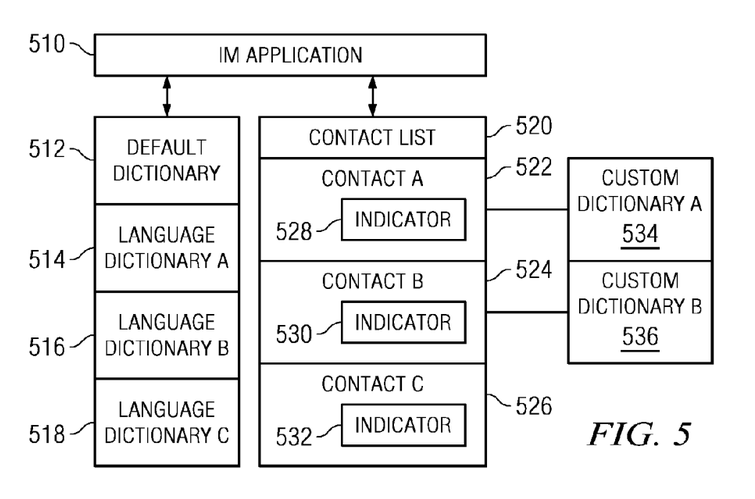
FIG. 5 is a data flow diagram of a personal custom dictionary for an instant messaging application according to an illustrative embodiment.

Referring now to FIG. 5, a data flow diagram of a personal custom dictionary for an instant messaging application is shown according to an illustrative embodiment. Instant messaging application 510 can be instant messaging application 410 of FIG. 4. Contact list 520 can be contact list 308 of FIG. 3.

Associated with instant messaging application 510 is default dictionary 512. Default dictionary 512 is an electronic dictionary data store that may include a standard set of widely accepted dictionary terms. The terms in default dictionary 512 can be based upon a published dictionary such as, for example, but not limited to, Webster's® Dictionary.

Default dictionary 512 includes a set of one or more language dictionaries, such as, for example, language dictionary A 514, language dictionary B 516, and language dictionary C 518. Each of language dictionaries A 514-C 518 correspond to a language in which chat can be implemented within instant messaging application 510. For example, in one illustrative embodiment, language dictionary A 514 may be an electronic dictionary of terms in English; language dictionary B 516 may be an electronic dictionary of terms in Spanish; and language dictionary C 518 may be an electronic dictionary of terms in German.

Associated with instant messaging application 510 is contact list 520. Contact list 520 is similar to contact list 308 of FIG. 3, in that contact list 520 provides the user with a list of contacts, as well as other information, such as, for example, identifying other contacts that are currently online.

Contact list 520 includes contact A 522, contact B 524, and contact C 526. Each of contacts A 522-C 526 are those contacts that the user has added to contact list 520. Each of contacts A 522-C 526 includes one of indicators 528-532. Indicators 528-532 are indications of which of language dictionaries A 514-C 518 should be used as the default dictionary for that particular contact. For example, indicator 528 of contact A 522 could indicate that language dictionary A 514 should be used as the default dictionary for chat sessions with contact A 522, while indicator 530 of contact B 524 and indicator 532 of contact C 526 could indicate that language dictionary B 516 should be used as the default dictionary for chat sessions with contact B 524 and contact C 526.

Indicators 528-532 can be implemented as a pointer, a look-up, a linked list, a flag, or any other structure capable of indicating a particular one of language dictionaries A 514-C 518 from default dictionary 512. Thus, a user is able to indicate each contact within his contact list with a preferred language for the instant messaging. By indicating a preferred language of each contact, the user can instant message with those users in a preferred language and be unbothered by unknown words from a separate language, without manually changing the default dictionary. While the illustrative embodiment depicts contact list 520 with only 3 contacts, such is for illustrative purposes only; contact list 520 can have any number of contacts added thereto.

In one illustrative embodiment, any of contacts A 522-C 526 in contact list 520 can be provided with a personal custom dictionary. In one illustrative example, contact A 522 is provided with personal custom dictionary A 534, and contact B 524 is provided with personal custom dictionary 536. Each of personal custom dictionaries 534 and 536 is an electronic dictionary data store that includes additional terms added specifically by a user to be used only in instant messaging with the contact that is unique to that personal custom dictionary. For example, the terms in personal custom dictionary 534 are used in checking all text entered into an instant messaging session with contact A 522. However, the terms in personal custom dictionary 534 would not be used to check text entered into an instant messaging session with either of contact B 524 or contact C 526. Similarly, the terms in personal custom dictionary 536 are used in checking all text entered into an instant messaging session with contact B 524, but not in checking text for an instant messaging session with contact A 522 or contact C 526.

By maintaining a custom dictionary that is personal to each of the contacts, words that do not fall into the default dictionary, but are nonetheless useful in communication between the user and that contact, can be added to the personal custom dictionary for that contact. For example, a user may select a particular language dictionary as a default for communicating with a particular contact. The default language dictionary is typically chosen to be a language that both the user and the contact are relatively fluent, even if that chosen language is not a language in which either of the user or the contact is most comfortable. However, as communications between the user and the contact increases, it is likely that the user and the contact will be exposed to other words or phrases that are not within the default language dictionary, but will be mutually understood by the user and the contact. These mutually understood words or phrases can be added to the personal custom dictionary for that certain contact, without compromising the default dictionary.

For example, in one illustrative embodiment, an English speaking user is instant messaging with a bilingual Spanish/English speaking contact. Because English is a commonly understood language, the user may select one of language dictionaries A 514-C 518 that corresponds to the English language. As the instant messaging sessions continue between the user and the contact, it is likely that the user will be exposed to, and come to understand, various Spanish words or phrases. These Spanish words or phrases can then be added to the personal custom dictionary that corresponds to the Spanish/English speaking contact, without compromising the default English dictionary. The added Spanish words would therefore not appear in a separate chat session with an English speaking second client. The added Spanish words would be indicated as unknown in the user's instant messaging chat window with the second client.

Figure 6:
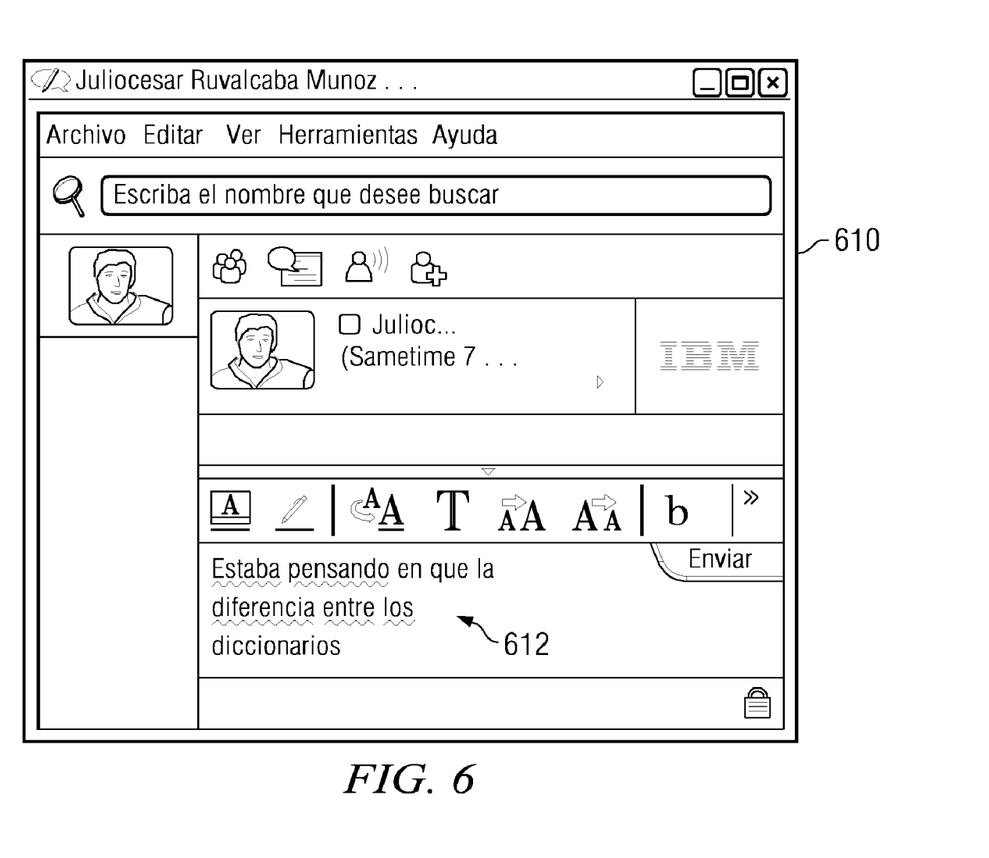
FIG. 6 is a flowchart for associating a default language dictionary with a contact according to an illustrative embodiment.

Referring now to FIG. 6, a screenshot of an example instant messaging window is shown according to the prior art. In the example of FIG. 6, a user has a default dictionary, such as default dictionary 414 of FIG. 4, set to English.

Text 612 is entered into example instant messaging window 610. The user here is typing in Spanish to a contact. As the text is entered into instant messaging window 610, the instant messaging application identifies a majority of the Spanish words as unknown. The instant messaging application compares the input Spanish text to terms in the selected English dictionary. Not surprisingly, because the majority of the Spanish text, "Estaba pensando en que la diferencia entre los diccionarios" was not located within the English dictionary, the Spanish terms of the input text are marked as unknown by the instant messaging application.

Figure 7:
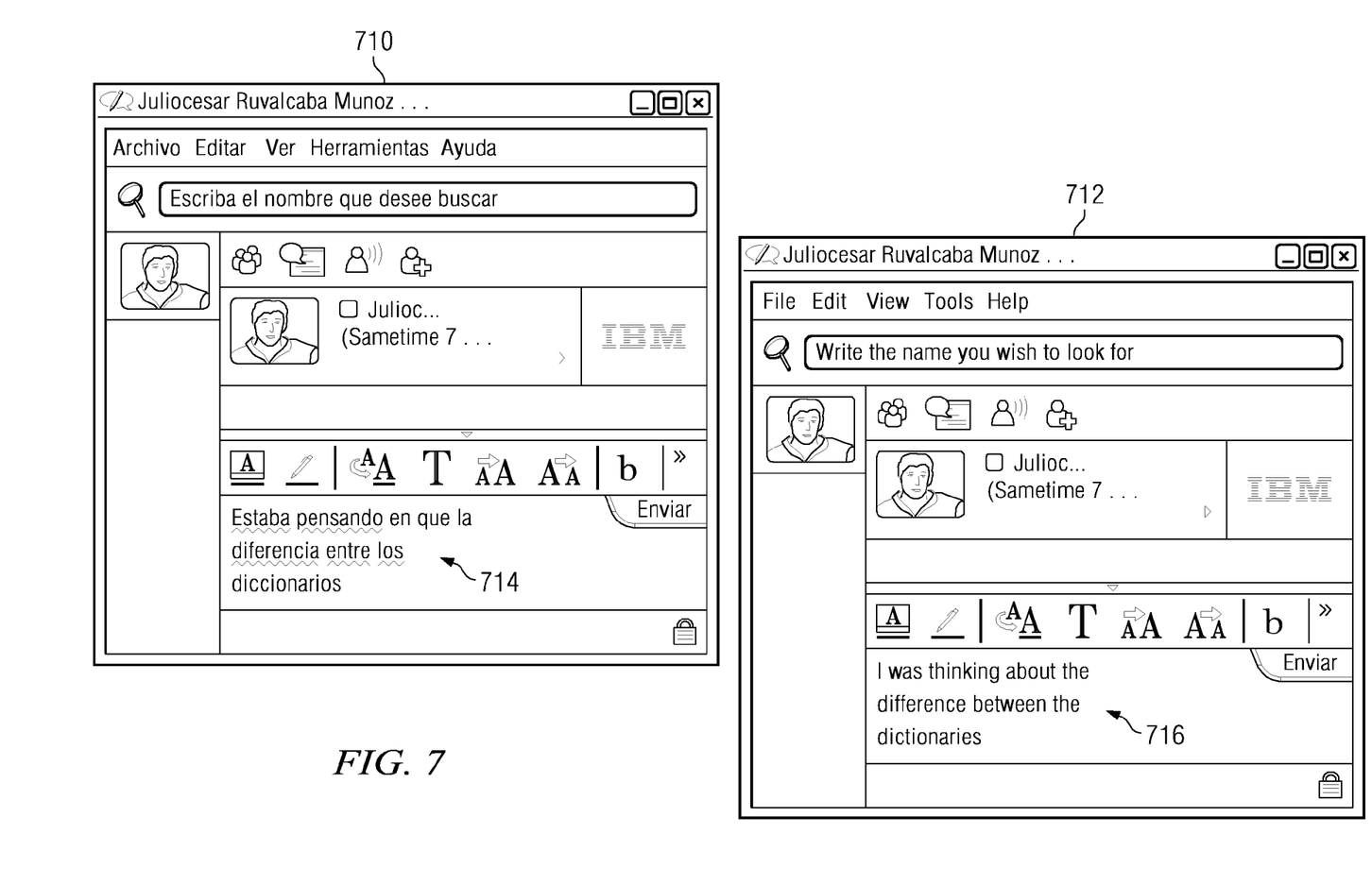
FIG. 7 is a flowchart for monitoring a chat session using a particular language dictionary and a personal custom dictionary according to an illustrative embodiment.

Referring now to FIG. 7, a screenshot of an example instant messaging window is shown according to an illustrative embodiment. In the example of FIG. 7, a user has two instant messaging windows open. Instant messaging window 710 corresponds to a instant messaging contact that is associated with a Spanish language dictionary, while instant messaging window 712 corresponds to a instant messaging contact that is associated with a English language dictionary.

Text 714 is entered into instant messaging window 710. Because the chat client has a language dictionary set to Spanish, the instant messaging application locates the Spanish text "Estaba pensando en que la diferencia entre los diccionarios" within the associated Spanish language dictionary. The Spanish text is therefore recognized, and not marked as unknown.

Similarly, text 716 is entered into instant messaging window 712. Because the chat client has a language dictionary set to English, the instant messaging application locates the English text "I was thinking about the difference between the dictionaries" within the associated English language dictionary. The English text is therefore recognized, and not marked as unknown.

Because the language dictionaries are personal to the instant messaging contacts, if text 714 had been entered into instant messaging window 712, text 714 would have been marked as unknown. Instant messaging window 712 corresponds to a instant messaging contact that is associated with a English language dictionary. Therefore, if Spanish text is entered into instant messaging window 712, the instant messaging application would not recognize the text, and mark the Spanish text as unknown. Similarly, if text 716 had been entered into instant messaging window 710, text 716 would have been marked as unknown. Instant messaging window 710 corresponds to a instant messaging contact that is associated with a Spanish language dictionary. Therefore, if English text is entered into instant messaging window 710, the instant messaging application would not recognize the text, and mark the English text as unknown.

Figure 8:
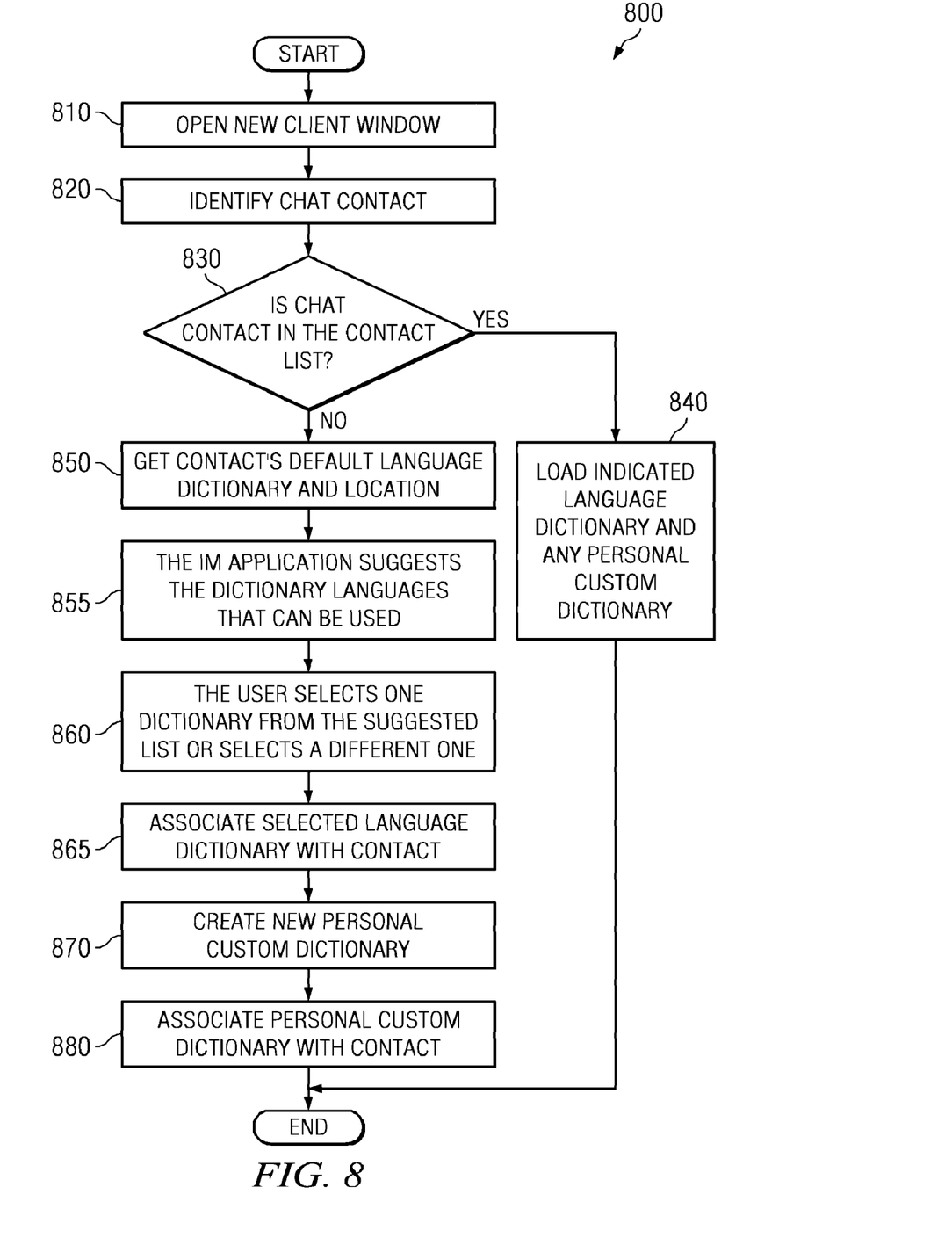
FIG. 8 is a screenshot of an example instant messaging window according to the prior art.

Referring now to FIG. 8, a flowchart for associating a default language dictionary with a contact is shown according to an illustrative embodiment. Process 800 is a software process, executing on a software component, such as instant messaging application 410 of FIG. 4. The default language dictionary can be default dictionary 512 of FIG. 5.

Process 800 begins when a new instant messaging session is initiated (step 810). The instant messaging session is initiated when a user opens a new chat window for a contact, or receives an instant message from a contact.

Responsive to initiating the new instant messaging session, process 800 identifies the instant messaging contact (step 820). The instant messaging contact is the remotely located recipient or sender of the instant message. That is, the instant messaging contact is the party to the instant messaging session who is not the user.

Responsive to identifying the instant messaging contact, process 800 identifies whether the instant messaging contact is a contact within the contact list (step 830). The contact list can be contact list 520 of FIG. 5. The contact list typically provides the user with a list of contacts with whom the user has previously communicated via instant messaging.

Responsive to identifying that the instant messaging contact is a contact within the contact list ("yes" at step 830), process 800 loads the particular language dictionary corresponding to the instant messaging contact, as well as any personal custom dictionary corresponding to the instant messaging contact (step 840), with the process terminating thereafter. The particular language dictionary can be one of language dictionaries A 514-C 518 of FIG. 5, that correspond to a language in which chat can be implemented within the instant messaging application. The particular language dictionary includes those terms in the default dictionary that can be based upon a published dictionary such as, for example, but not limited to, Webster's® Dictionary. The personal custom dictionary corresponding to the instant messaging contact can be one of personal custom dictionaries 534 and 536 of FIG. 5. The personal custom dictionary is an electronic dictionary data store that includes additional terms added specifically by the user to be used only in instant messaging with the instant messaging contact that are unique to that personal custom dictionary.

If the instant messaging contact is not within the contact list, process 800 associates a default dictionary within the chat client. Returning now to step 830, responsive to not identifying that the instant messaging contact is a contact within the contact list ("no" at step 830), process 800 identifies a default language dictionary and location for the instant messaging contact (step 850). The default language dictionary and location for the instant messaging contact can be identified from instant messaging contact's user settings that were communicated to an instant messaging server. The default language dictionary and location for the instant messaging contact can also be identified from the instant messaging contact.

Responsive to identifying a default language dictionary and location for the instant messaging contact, process 800 presents a list of various suggested language dictionaries to the user (step 855). The particular language dictionary dictionaries within the list of suggested language dictionaries can be, but is are not limited to: a) the user's default dictionary; b) the contact's default dictionary; c) the contact's default dictionary based on the location of the contact; and d) any other dictionary based on a common language between the user and the contact. The particular language dictionary can be one of language dictionaries A 514-C 518 of FIG. 5, that correspond to a language in which chat can be implemented within the instant messaging application.

Process 800 then receives a selection of a particular language dictionary to be associated with the instant messaging contact (step 860). The selection can be one of the suggested language dictionaries that were presented to the user. Conversely, the selection can be a particular language dictionary not included in the list of suggested language dictionaries. For example, if a user knows that a common language is shared between the user and the instant messaging contact, the user may desire to set a particular language dictionary for the common language, regardless of whether that particular language dictionary is included among the list of suggested language dictionaries.

Responsive to receiving the indication from the user for a particular language dictionary to use with the instant messaging contact, process 800 associates the particular language dictionary with the instant messaging contact (step 865). Any future chat sessions with the instant messaging contact will automatically recall the selected language dictionary. The particular language dictionary can be associated with the instant messaging contact by setting an indicator, such as one of indicators 528-532 of FIG. 5.

Responsive to associating the particular language dictionary with the instant messaging contact, process 800 creates a new personal custom dictionary for the instant messaging contact (step 870). The personal custom dictionary can be one of personal custom dictionaries 534 and 536 of FIG. 5. The personal custom dictionary is an electronic dictionary data store that includes additional terms added specifically by the user to be used only in instant messaging with the instant messaging contact that are unique to that personal custom dictionary.

Responsive to creating the new personal custom dictionary for the instant messaging contact, process 800 associates the new personal custom dictionary with the instant messaging contact (step 875), with the process terminating thereafter. By maintaining a custom dictionary that is personal to each of the contacts, words that do not fall into the default dictionary, but are nonetheless useful in communication between the user and that contact, can be added to the personal custom dictionary for that contact.

Figure 9:
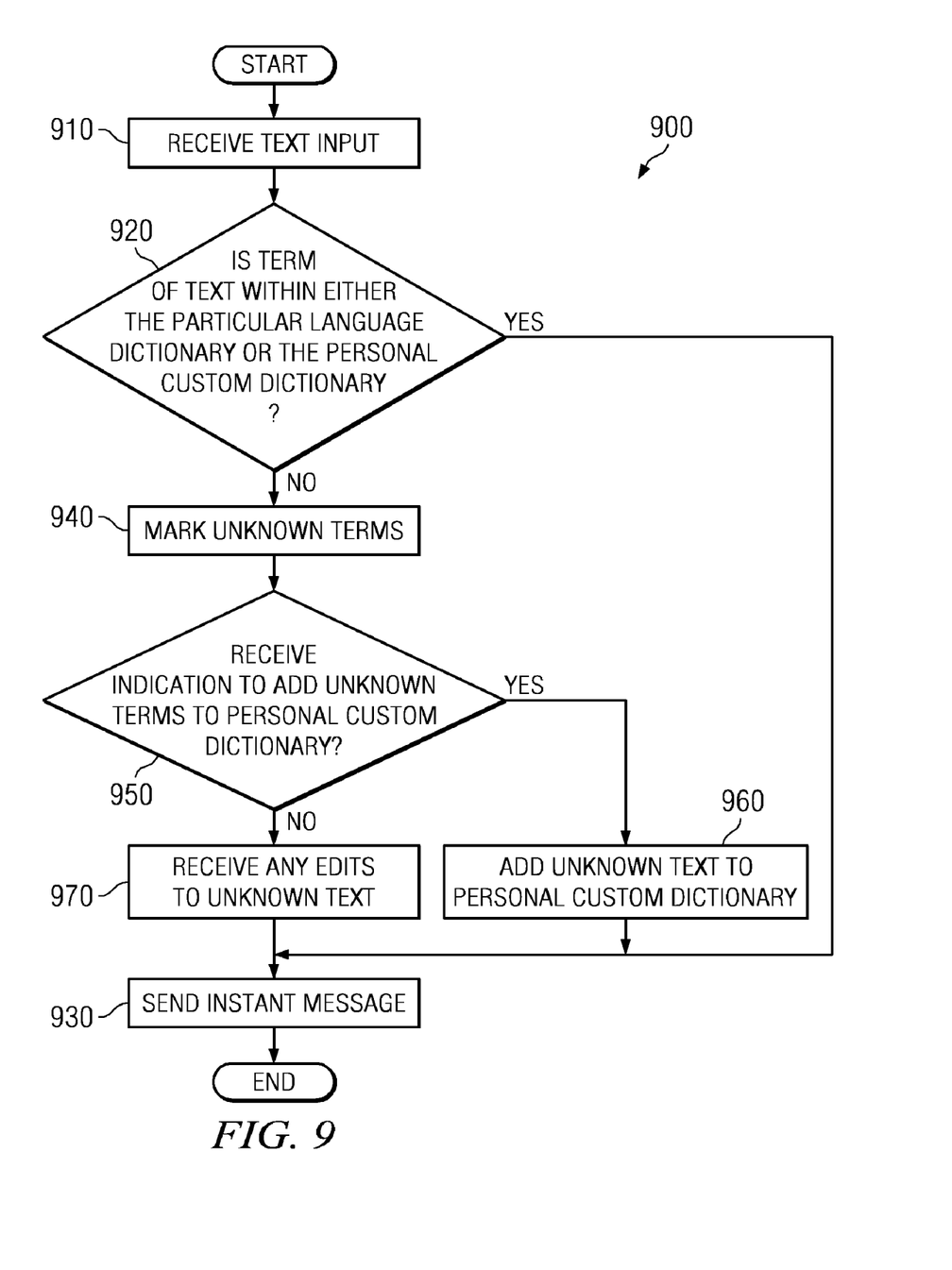
FIG. 9 is a screenshot of an example instant messaging window according to an illustrative embodiment.

Referring now to FIG. 9, a flowchart for monitoring a chat session using a particular language dictionary and a personal custom dictionary is shown according to an illustrative embodiment. Process 900 is a software process executing on a software component, such as instant messaging application 410 of FIG. 4. The personal custom dictionary can be one of personal custom dictionaries 534 and 536 of FIG. 5.

Process 900 begins by receiving text input (step 910). The text input contains terms which the user desires to send to a contact via the instant messaging service.

Responsive to receiving the text input, process 900 identifies whether a term of the text input are within either the particular language dictionary associated with the instant messaging contact, or the personal custom dictionary associated with the instant messaging contact (step 920). The particular language dictionary can be one of language dictionaries A 514-C 518 of FIG. 5, that correspond to a language in which chat can be implemented within the instant messaging application. The particular language dictionary includes those terms in the default dictionary that can be based upon a published dictionary such as, for example, but not limited to, Webster's® Dictionary. The personal custom dictionary corresponding to the instant messaging contact can be one of personal custom dictionaries 534 and 536 of FIG. 5. The personal custom dictionary is an electronic dictionary data store that includes additional terms added specifically by the user to be used only in instant messaging with the instant messaging contact that are unique to that personal custom dictionary.

Responsive to identifying that the term of the text input is within either the particular language dictionary associated with the instant messaging contact, or the personal custom dictionary associated with the instant messaging contact ("yes" at step 920), process 900 polls for a "send command" for the text input (step 930), with the process terminating thereafter. Because the terms of the text input were located in either the particular language dictionary associated with the instant messaging contact, or the personal custom dictionary associated with the instant messaging contact, the terms were not marked as unknown.

Returning now to step 920, responsive to not identifying that the term of the text input is within either the particular language dictionary associated with the instant messaging contact, or the personal custom dictionary associated with the instant messaging contact ("no" at step 920), process 900 marks the term as unknown (step 940). The unknown term is not located within either of the particular language dictionary or the personal custom dictionary. The term can be marked as unknown by a visual cue, such as, for example, but not limited to, underlining or discoloring of the term.

Responsive to marking the term as unknown, process 900 then identifies whether an indication is received that the marked term should be added to the personal custom dictionary (step 950). The indication is an affirmative input from the user, and can be, for example, but not limited to, a mouse click of the term or a selection from a menu within a user interface.

Responsive to identifying that an indication is received that the marked term should be added to the personal custom dictionary ("yes" at step 950), process 900 adds the unknown text to the personal custom dictionary (step 960). The user has indicated that the added term, while not included in the default language dictionary, is nonetheless useful in communication between the user and that contact. The term should therefore be added to the personal custom dictionary.

Responsive to adding the unknown text to the personal custom dictionary, process 900, process 900 polls for a "send command" for the text input (step 930), with the process terminating thereafter.

Returning now to step 950, responsive to not identifying that an indication is received that the marked term should be added to the personal custom dictionary ("no" at step 950), process 900 receives any edits to the unknown text (step 970). The user has elected not to add the unknown term to the personal custom dictionary. Therefore, it is probably that the term is either a misspelling of a known term, or a term that is unknown to the instant messaging contact. Therefore, the user may desire to edit the term by correcting the spelling thereof, or by choosing a different term that is known to the instant messaging contact.

Responsive to receiving any edits to the unknown text, process 900 polls for a "send command" for the text input (step 930), with the process terminating thereafter.

Thus, the illustrative embodiments herein provide a computer implemented method, a data processing system, and a computer program product for providing a custom dictionary associated with an instant messaging contact. Contacts in a contact list are provided with a personal custom dictionary that is associated with the contact. Thus, an instant messaging application may include several personal custom dictionaries, with possibly as many personal custom dictionaries as contacts in the contact list.

When an instant messaging session is initiated, the instant messaging application selects a default dictionary, based on the predominant language that has been indicated for instant messages between the user and the contact. The user can also create a custom dictionary that is personal to the contact, such that entered terms are checked against the instant messaging application selected default dictionary, as well as the personal custom dictionary. By maintaining separate personal custom dictionaries for the contacts, the instant messaging application can switch seamlessly between chat sessions in a variety of languages.

Thus, the illustrative embodiments herein describe a computer implemented method, computer usable recordable-type medium having a computer usable program code, and a data processing system for providing a custom dictionary associated with an instant messaging contact. A chat window within an instant messaging application with the instant messaging contact is initially opened. The chat window is associated with the instant messaging contact. The instant messaging application then identifies whether the instant messaging contact is listed in a contact list. If the instant messaging contact is listed in a contact list of the instant messaging application, a default language dictionary that is associated with the instant messaging contact is loaded. The default language dictionary is one of a plurality of language dictionaries for languages that can be implemented within the instant messaging application. Further, if the instant messaging contact is listed in a contact list of the instant messaging application, a personal custom dictionary associated with the instant messaging contact is also loaded. The personal custom dictionary is unique to the instant messaging contact and is not shared with other instant messaging contacts.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing a custom dictionary associated with an instant messaging contact, the computer implemented method comprising:

opening, by a processor, a chat window within an instant messaging application with the instant messaging contact, wherein the chat window is associated with the instant messaging contact;

identifying, by the processor, whether the instant messaging contact is listed in a contact list of the instant messaging application;

responsive to identifying that the instant messaging contact is listed in a contact list of the instant messaging application, loading, by the processor, a default language dictionary that is associated with the instant messaging contact, wherein the default language dictionary is one of a plurality of language dictionaries for languages for the instant messaging application;

further responsive to identifying that the instant messaging contact is listed in a contact list of the instant messaging application, loading, by the processor, a personal custom dictionary associated with the instant messaging contact, wherein the personal custom dictionary is unique to the instant messaging contact, wherein the personal custom dictionary is not one of the plurality of language dictionaries;

responsive to identifying that the instant messaging contact is not listed in the contact list of the instant messaging application, identifying, by the processor, the default language dictionary for the chat instant messaging contact; and further responsive to identifying that the instant messaging contact is not listed in the contact list of the instant messaging application, creating, by the processor, the personal custom dictionary, wherein the personal custom dictionary is unique to the instant messaging contact and is not shared with other instant messaging contacts.

2. The computer implemented method of claim 1, wherein the step of identifying the default language dictionary for the chat instant messaging contact further comprises:

identifying, by the processor, the default language dictionary for the chat instant messaging contact, wherein the default language dictionary is identified from the list of language dictionaries including a default dictionary of a user, a default dictionary of the instant messaging contact, a default dictionary of the instant messaging contact based on a location of the instant messaging contact, and a default dictionary based on a common language between the user and the instant messaging contact.

3. The computer implemented method of claim 1, further comprising:

receiving messaging text from a user into the chat window of the instant messaging application;

responsive to receiving messaging text from the user into the chat window, comparing, by the processor, the messaging text to the default language dictionary and the personal custom dictionary;

responsive to not identifying the messaging text within the default language dictionary and the personal custom dictionary, marking, by the processor, the messaging text as unknown.

4. The computer implemented method of claim 3, further comprising:

responsive to marking the messaging text as unknown, receiving, by the processor, an indication from the user that the messaging text should be added to the personal custom dictionary, wherein the messaging text is unique to the personal custom dictionary of the instant messaging contact and is not shared with other instant messaging contacts.

5. The computer implemented method of claim 1, wherein the step of loading the personal custom dictionary associated with the instant messaging contact further comprises:

loading, by the processor, the personal custom dictionary associated with the instant messaging contact wherein the personal custom dictionary is one of a plurality of personal custom dictionaries, wherein the contact list further comprises a plurality of instant messaging contacts, each of the plurality of instant messaging contacts including one of a plurality of indicators, wherein each of the plurality of indicators indicates a separate one of the plurality of personal custom dictionaries, wherein each of the plurality of personal custom dictionaries is unique to the instant messaging contact with which the personal custom dictionary is associated, such that entries within one of the plurality of personal custom dictionaries are not shared with others of the plurality of personal custom dictionaries.

6. The computer implemented method of claim 5, wherein each of the plurality of indicators is selected from a group of indicators including a pointer, a look-up table, a linked list, and a flag.

7. A non-transitory computer usable memory medium having a computer usable program code for providing a custom dictionary associated with an instant messaging contact, the computer usable program code comprising:

computer usable program code for opening a chat window within an instant messaging application with the instant messaging contact, wherein the chat window is associated with the instant messaging contact;

computer usable program code for identifying whether the instant messaging contact is listed in a contact list of the instant messaging application;

computer usable program code, responsive to identifying that the instant messaging contact is listed in the contact list of the instant messaging application, for loading a default language dictionary that is associated with the instant messaging contact, wherein the default language dictionary is one of a plurality of language dictionaries for languages for the instant messaging application;

computer usable program code, further responsive to identifying that the instant messaging contact is listed in the contact list of the instant messaging application, for loading a personal custom dictionary associated with the instant messaging contact, wherein the personal custom dictionary is unique to the instant messaging contact and is not shared with other instant messaging contacts, wherein the personal custom dictionary is not one of the plurality of language dictionaries; computer usable program code, responsive to not identifying that the instant messaging contact is listed in the contact list of the instant messaging application, for identifying the default language dictionary for the chat instant messaging contact; and     computer usable program code, further responsive to not identifying that the instant messaging contact is listed in the contact list of the instant messaging application, for creating the personal custom dictionary, wherein the personal custom dictionary is unique to the instant messaging contact and is not shared with other instant messaging contacts.

8. The non-transitory computer usable memory medium having the computer usable program code of claim 7, wherein the computer usable program code for identifying the default language dictionary for the chat instant messaging contact further comprises:

computer usable program code for identifying the default language dictionary for the chat instant messaging contact, wherein the default language dictionary is identified from the list of language dictionaries including a default dictionary of a user, a default dictionary of the instant messaging contact, a default dictionary of the instant messaging contact based on a location of the instant messaging contact, and a default dictionary based on a common language between the user and the instant messaging contact.

9. The non-transitory computer usable memory medium having the computer usable program code of claim 7, further comprising:

computer usable program code for receiving messaging text from a user into the chat window of the instant messaging application;

computer usable program code for, responsive to receiving messaging text from a user into the chat window, comparing the messaging text to the default language dictionary and the personal custom dictionary;

computer usable program code, responsive to not identifying the messaging text to the default language dictionary and the personal custom dictionary, for marking the messaging text as unknown.

10. The non-transitory computer usable memory medium having the computer usable program code of claim 9, further comprising:

computer usable program code, responsive to marking the messaging text as unknown, for receiving an indication from the user that the messaging text should be added to the personal custom dictionary, wherein the messaging text is unique to the personal custom dictionary of the instant messaging contact and is not shared with other instant messaging contacts.

11. The non-transitory computer usable memory medium having the computer usable program code of claim 7, wherein the computer usable program code for loading the personal custom dictionary associated with the instant messaging contact further comprises:

computer usable program code for loading the personal custom dictionary associated with the instant messaging contact wherein the personal custom dictionary is one of a plurality of personal custom dictionaries, wherein the contact list further comprises a plurality of instant messaging contacts, each of the plurality of instant messaging contacts including one of a plurality of indicators, wherein each of the plurality of indicators indicates a separate one of the plurality of personal custom dictionaries, wherein each of the plurality of personal custom dictionaries is unique to the instant messaging contact with which the personal custom dictionary is associated, such that entries within one of the plurality of personal custom dictionaries are not shared with others of the plurality of personal custom dictionaries.

12. The non-transitory computer usable memory medium having the computer usable program code of claim 11, wherein each of the plurality of indicators is selected from a group of indicators including a pointer, a look-up table, a linked list, and a flag.

13. A data processing system for providing a custom dictionary associated with an instant messaging contact, the data processing system comprising:

a bus;

a storage device connected to the bus, wherein the storage device contains computer usable code;

a communications unit connected to the bus; and a processing unit connected to the bus, wherein the processing unit executes the computer usable code to open a chat window within an instant messaging application with the instant messaging contact, wherein the chat window is associated with the instant messaging contact; to identify whether the instant messaging contact is listed in a contact list of the instant messaging application; responsive to identifying that the instant messaging contact is listed in the contact list of the instant messaging application, to load a default language dictionary that is associated with the instant messaging contact, wherein the default language dictionary is one of a plurality of language dictionaries for languages that can be implemented within the instant messaging application; further responsive to identifying that the instant messaging contact is listed in the contact list of the instant messaging application, to load a personal custom dictionary associated with the instant messaging contact, wherein the personal custom dictionary is unique to the instant messaging contact and is not shared with other instant messaging contacts, wherein the personal custom dictionary is not one of the plurality of language dictionaries; responsive to not identifying that the instant messaging contact is listed in the contact list of the instant messaging application, to identify the default language dictionary for the chat instant messaging contact; and further responsive to not identifying that the instant messaging contact is listed in the contact list of the instant messaging application, to create the personal custom dictionary, wherein the personal custom dictionary is unique to the instant messaging contact and is not shared with other instant messaging contacts.

14. The data processing system of claim 13, wherein the processing unit executes the computer usable code to identify the default language dictionary for the chat instant messaging contact further comprises:

the processing unit executes the computer usable code to identify the default language dictionary for the chat instant messaging contact, wherein the default language dictionary is identified from the list of language dictionaries including a default dictionary of a user, a default dictionary of the instant messaging contact, a default dictionary of the instant messaging contact based on a location of the instant messaging contact, and a default dictionary based on a common language between the user and the instant messaging contact.

15. The data processing system of claim 13, wherein the processing unit executes the computer usable code to receive messaging text from a user into the chat window of the instant messaging application; responsive to receiving messaging text from the user into the chat window, to compare the messaging text to the default language dictionary and the personal custom dictionary; and responsive to not identifying the messaging text to the default language dictionary and the personal custom dictionary, to mark the messaging text as unknown.

16. The data processing system of claim 15, wherein the processing unit executes the computer usable code, responsive to marking the messaging text as unknown, to receive an indication from the user that the messaging text should be added to the personal custom dictionary, wherein the messaging text is unique to the personal custom dictionary of the instant messaging contact and is not shared with other instant messaging contacts.

17. The data processing system of claim 13, wherein the processing unit executing the computer usable code to load the personal custom dictionary associated with the instant messaging contact further comprises:

processing unit executing the computer usable code to load the personal custom dictionary associated with the instant messaging contact wherein the personal custom dictionary is one of a plurality of personal custom dictionaries, wherein the contact list further comprises a plurality of instant messaging contacts, each of the plurality of instant messaging contacts including one of a plurality of indicators, wherein each of the plurality of indicators indicates a separate one of the plurality of personal custom dictionaries, wherein each of the plurality of personal custom dictionaries is unique to the instant messaging contact with which the personal custom dictionary is associated, such that entries within one of the plurality of personal custom dictionaries are not shared with others of the plurality of personal custom dictionaries.

* * * * *